United States Patent
Austel et al.

(10) Patent No.: US 9,292,619 B2
(45) Date of Patent: Mar. 22, 2016

(54) METHOD AND SYSTEM FOR DETECTING MOVEMENT OF A SIGNED ELEMENT IN A STRUCTURED DOCUMENT

(75) Inventors: Paula K. Austel, Cortlandt Manor, NY (US); Maryann Hondo, Arlington, MA (US); Michael McIntosh, Clifton, NJ (US); Anthony J. Nadalin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2392 days.

(21) Appl. No.: 11/427,408

(22) Filed: Jun. 29, 2006

(65) Prior Publication Data

US 2008/0005660 A1    Jan. 3, 2008

(51) Int. Cl.
*G06F 17/00* (2006.01)
*G06F 17/30* (2006.01)
*G06F 21/64* (2013.01)

(52) U.S. Cl.
CPC .......... *G06F 17/30908* (2013.01); *G06F 21/64* (2013.01)

(58) Field of Classification Search
CPC ............................ G06F 21/64; G06F 17/30908
USPC .......................................... 715/234, 237, 271
See application file for complete search history.

(56) References Cited

U.S. PATENT DOCUMENTS

| | | | |
|---|---|---|---|
| 6,941,511 B1 | 9/2005 | Hind et al. | |
| 7,299,408 B1 * | 11/2007 | Daconta et al. | 715/234 |
| 2001/0002485 A1 * | 5/2001 | Bisbee et al. | 713/167 |
| 2002/0019937 A1 | 2/2002 | Edstrom et al. | |
| 2002/0040431 A1 | 4/2002 | Kato et al. | |
| 2002/0062322 A1 * | 5/2002 | Genghini et al. | 707/500 |
| 2002/0091925 A1 * | 7/2002 | Suzuki et al. | 713/168 |
| 2003/0145197 A1 | 7/2003 | Lee et al. | |
| 2004/0088555 A1 * | 5/2004 | Girard et al. | 713/192 |
| 2004/0168064 A1 | 8/2004 | Shimizu et al. | |
| 2004/0226002 A1 * | 11/2004 | Larcheveque et al. | 717/126 |
| 2005/0015600 A1 * | 1/2005 | Miyazaki et al. | 713/176 |
| 2005/0063545 A1 | 3/2005 | Fujimoto et al. | |
| 2005/0086513 A1 * | 4/2005 | Foody | 713/200 |
| 2005/0144457 A1 * | 6/2005 | Lee et al. | 713/176 |
| 2005/0149729 A1 * | 7/2005 | Zimmer et al. | 713/168 |
| 2005/0172131 A1 * | 8/2005 | Nakayama et al. | 713/176 |
| 2005/0193202 A1 | 9/2005 | Gajjala et al. | |
| 2005/0228982 A1 | 10/2005 | Nakayama et al. | |
| 2005/0273772 A1 * | 12/2005 | Matsakis et al. | 717/136 |

OTHER PUBLICATIONS

Kahn et al, "Change Detection of XML Documents Using Signatures," Journal of Digital Information Management, vol. 2, No. 3, pp. 142-147, Sep. 2004.

* cited by examiner

*Primary Examiner* — Stephen Hong
*Assistant Examiner* — Marshon Robinson
(74) *Attorney, Agent, or Firm* — David H. Judson (57) ABSTRACT

A sending entity creates a structured document and communicates it to a receiving entity includes a transform to ensure document elements are not moved during communication. The structured document comprises a root element and a set of child elements. A child element is protected by a digital signature, prior to being positioned within the document. This element includes a sending entity security policy. The receiving entity includes a transform that determines whether the signed element is in a given position within the received document. The transform evaluates the data string against a set of ancestor elements of the signed element to determine whether the signed element is in the given position. If so, the transform preferably outputs the signed element itself. If the transform determines that the signed element has been moved, however, preferably it outputs a given value other than the signed element.

22 Claims, 9 Drawing Sheets

```
001    <soap:Envelope ...>
002        <soap:Body>
003            <getQuote Symbol="IBM"/>
004        </soap:Body>
005    </soap:Envelope>
```

FIG. 1
(PRIOR ART)

```
001   <soap:Envelope ...>
002     <soap:Body>
003       <getQuote Symbol="IBM"/>
004     </soap:Body>
005   </soap:Envelope>
```

001 <soap:Envelope ... >
002   <soap:Header>
003     <wsse:Security>
004       <wsse:BinarySecurityToken
005           ValueType=" ...#X509v3"
006           EncodingType="...#Base64Binary"
007           wsu:Id="X509Token">
008         MIabcdefg0123456789...
009       </wsse:BinarySecurityToken>
010       <ds:Signature>
011         <ds:SignedInfo>
012           <ds:CanonicalizationMethod
013               Algorithm=" ... /xml-exc-c14n#" />
014           <ds:SignatureMethod
015               Algorithm="...#rsa-sha1" />
016           <ds:Reference URI="#theBody">
017             <ds:Transforms>
018               <ds:Transform
019                   Algorithm=".../xml-exc-c14n#"/>
020             </ds:Transforms>
021             <ds:DigestMethod
022                 Algorithm=".../xmldsig#sha1"/>
023             <ds:DigestValue>
024               AbCdEfG0123456789...
025             </ds:DigestValue>
026           </ds:Reference>
027         </ds:SignedInfo>
028         <ds:SignatureValue>
029           AbCdEfG0123456789 ...
030         </ds:SignatureValue>
031         <ds:KeyInfo>
032           <wsse:SecurityTokenReference>
033             <wsse:Reference URI="#X509Token"/>
034           </wsse:SecurityTokenReference>
035         </ds:KeyInfo>
036       </ds:Signature>
037     </wsse:Security>
038   </soap:Header>
039   <soap:Body wsu:Id="theBody">
040     <getQuote Symbol="IBM"/>
041   </soap:Body>
042 </soap:Envelope>
```

```
001  <soap:Envelope ...>
002    <soap:Header>
003      <wsse:Security>
004        ...
005        <ds:Signature>
006          <ds:SignedInfo>
007            ...
008            <ds:Reference URI="#theBody">
009              ...
010            </ds:Reference>
011          </ds:SignedInfo>
012          ...
013        </ds:Signature>
014      </wsse:Security>
015      <Wrapper
016          soap:mustUnderstand="0"
017          soap:role=".../none">
018        <soap:Body wsu:Id="theBody">
019          <getQuote Symbol="IBM"/>
020        </soap:Body>
021      </Wrapper>
022    </soap:Header>
023    <soap:Body wsu:Id="newBody">
024      <getQuote Symbol="MBI"/>
025    </soap:Body>
026  </soap:Envelope>
```

*FIG. 4*

```
001  <soap:Envelope ...>
002    <soap:Header>
003      <wsse:Security>
004        ...
005        <ds:Signature>
006          <ds:SignedInfo>
007            ...
008            <ds:Reference URI="#theBody">
009              ...
010            </ds:Reference>
011            <ds:Reference URI="#theReplyTo">
012              ...
013            </ds:Reference>
014          </ds:SignedInfo>
015          ...
016        </ds:Signature>
017      </wsse:Security>
018      <wsa:ReplyTo wsu:Id="theReplyTo>
019        <wsa:Address>http://good.com/</wsa:Address>
020      </wsa:ReplyTo>
021    </soap:Header>
022    <soap:Body wsu:Id="theBody">
023      <getQuote Symbol="IBM"/>
024    </soap:Body>
025  </soap:Envelope>
```

*FIG. 5*

```
001 <soap:Envelope ...>
002   <soap:Header>
003     <wsse:Security>
004       ...
005       <ds:Signature>
006         <ds:SignedInfo>
007           ...
008           <ds:Reference URI="#theBody">
009             ...
010           </ds:Reference>
011           <ds:Reference URI="#theReplyTo" >
012             ...
013           </ds:Reference>
014         </ds:SignedInfo>
015         ...
016       </ds:Signature>
017     </wsse:Security>
018     <Wrapper
019       soap:mustUnderstand="0"
020       soap:role=".../none">
021     <wsa:ReplyTo wsu:Id="theReplyTo>
022         <wsa:Address>http://good.com/</wsa:Address>
023     </wsa:ReplyTo>
024     </Wrapper>
025   </soap:Header>
026   <soap:Body wsu:Id="theBody">
027     <getQuote Symbol="IBM"/>
028   </soap:Body>
029 </soap:Envelope>
```

*FIG. 6*

```
001 <soap:Envelope ...>
002   <soap:Header>
003     <wsse:Security>
004       ...
005       <ds:Signature>
006         <ds:SignedInfo>
007           ...
008           <ds:Reference URI="#theBody">
009             ...
010           </ds:Reference>
011           <ds:Reference URI=" ">
012             <ds:Transforms>
013               <ds:Transform
014                 Algorithm=".../REC-xpath-19991116">
015                 <ds:XPath...>
016                   /soap:Envelope/soap:Header/wsa:ReplyTo
017                 </ds:XPath>
018               </ds:Transform>
019               <ds:Transform
020                 Algorithm=".../xml-exc-c14n#"/>
021             </ds:Transforms>
022             ...
023           </ds:Reference>
024         </ds:SignedInfo>
025         ...
026       </ds:Signature>
027     </wsse:Security>
028     <wsa:ReplyTo wsu:Id="theReplyTo>
029       <wsa:Address>http://good.com/</wsa:Address>
030     </wsa:ReplyTo>
031   </soap:Header>
032   <soap:Body wsu:Id="theBody">
033     <getQuote Symbol="IBM"/>
034   </soap:Body>
035 </soap:Envelope>
```

METHOD AND SYSTEM FOR DETECTING MOVEMENT OF A SIGNED ELEMENT IN A STRUCTURED DOCUMENT

COPYRIGHT STATEMENT

A portion of the disclosure of this patent document contains material that is subject to copyright protection. The copyright owner has no objection to the facsimile reproduction of the patent document as it appears in the Patent & Trademark Office file or records, but it otherwise reserves all copyright rights.

BACKGROUND OF THE INVENTION

1. Technical Field

The present invention relates generally to protecting a structured (e.g., XML) document against undetected modification by an adversary during communication of the document over a computer network.

2. Background of the Related Art

Extensible markup language (XML) facilitates the exchange of information in a tree structure. An XML document typically contains a single root element. Each element has a name, a set of attributes, and a value consisting of character data, and a set of child elements. The interpretation of the information conveyed in an element is derived by evaluating its name, attributes, value and position in the document. Simple Object Access Protocol (SOAP) is a lightweight XML based protocol commonly used for invoking Web Services and exchanging structured data and type information on the Web. Using SOAP, XML-based messages are exchanged over a computer network, normally using HTTP (Hypertext Transfer Protocol).

XML Signatures is a proposed W3C (World Wide Web Consortium) Recommendation that describes XML syntax and processing rules for creating and representing digital signatures. XML Signatures are designed to facilitate integrity protection and origin authentication for data of any type, whether located within the XML that includes the signature or elsewhere. An important property of XML Signature is that signed XML elements along with the associated signature may be copied from one document into another while retaining the ability to verify the signature. This property can be useful in scenarios where multiple actors process and potentially transform a document throughout a business process. This same property, however, can be exploited by an adversary allowing the undetected modification of documents.

Thus, for example, the most common and most efficient method for referencing signed content from an XML Signature involves a shorthand reference to an element containing a specific ID attribute value. When XML element content is protected in this manner, any changes to the element content, including content modification and removal of the entire element, can be detected. An attacker, however, can move the element elsewhere within the document without modifying the element content. Because the semantics associated with XML elements are dependent on the element's location within the XML document, such element movement potentially may change the meaning of the document contents. In the general case of XML, simple countermeasures may effectively prevent these attacks, although such techniques suffer a drawback of being computationally-inefficient. SOAP, moreover, defines a message structure and associated processing rules that, in many cases, preclude the use of these simple countermeasures.

Therefore, there remains a need in the art to provide improved countermeasures that overcome these and other deficiencies.

BRIEF SUMMARY OF THE INVENTION

The present invention is implemented within a system in which a sending entity creates a structured document and communicates that document to a receiving entity. The structured document is typically XML, and the document comprises a root element and a set of one or more child elements. At least one child element is protected, for example, by a digital signature, prior to being positioned within the XML document. This "signed" element includes a sending entity security policy, preferably in the form of a position dependent or absolute path expression. The receiving entity includes a transform that determines whether the signed element is in a given position within the received XML document. Typically, the given position is the position at which the signed element was placed within the structured document by the sending entity. The transform evaluates the data string against a set of one or more ancestor elements of the signed element to determine whether the signed element is in the given position within the received document. If so, the transform preferably outputs the signed element itself. If the transform determines that the signed element has been moved, however, preferably it outputs a given value other than the signed element. The transform is computationally-efficient because it works by enforcing an intended path (as specified in the position dependent or absolute path expression) from the signed element back up to the XML document root. In effect, the algorithm requires visitation of only the referenced element's ancestors, and not the entire XML tree.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

As is well known, enterprises are adopting Web Services to ease application integration across heterogeneous environments within and across security domain boundaries. The Organization for the Advancement of Structured Information Standards (OASIS) has recently ratified various Web Services Security (WSS) standards to provide an extensible framework for providing message integrity, confidentiality, identity propagation, and authentication. In a typical scenario, illustrated in FIG. 1, SOAP messages are sent from an initial SOAP sender 100 to an ultimate SOAP receiver 102 along a SOAP message path comprising zero or more SOAP intermediaries 104 that process and potentially transform the SOAP message. The use of SOAP here is merely illustrative, and it should not be taken to limit the scope of the present invention, which does not depend on the particular transport mechanism used to transfer a protected message. The devices 100, 102 and 104 are computing entities, such as data processing systems each comprising hardware and software, which entities communicate with one another over a network, such as the publicly-routed Internet, an intranet, an extranet, a private network, or any other communications medium or link. As described below, a data processing system typically comprises one or more processors, an operating system, an application server, one or more applications and one or more utilities. A given data processing system may be a sender or sending entity, in which case the system is deemed to be on a "sender side" of the transmission, or a receiver or receiving entity, in which case the system is deemed to be on a "receiver side." The applications on the data processing system provide native support for Web Services including, without limitation, support for SOAP, XML, XML Signature (described in more detail below), XPath (a query language used to identify a set of nodes within an XML document), and XPointer (a language for locating data within an XML document based on properties such as location within the document, character content, and attribute values, and the like). Familiarity with these technologies and standards is presumed. Transport layer security mechanisms, such as HTTP over TLS (Transport Layer Security), may be used to secure messages between two adjacent SOAP nodes, whereas message layer security mechanisms defined in the WSS standard must be used in the presence of intermediaries, or when data origin authentication is required. SOAP messages are composed of XML elements. Elements may be signed and/or encrypted by being referenced from a signature or a reference list within an encrypted key. Individual elements within a message may be referenced from multiple signatures and/or reference lists, and messages may be composed of signed and/or encrypted elements from other messages. An intermediaries process messages, they potentially sign and encrypt new and pre-existing data, as well as consume signed and encrypted data. The security context of the message must be preserved as it undergoes these transformations.

As noted above, XML Signature defines XML syntax and processing rules for signing and verifying digital signatures over one or more data objects. XML Signatures use a set of indirect references to each signed data object, allowing for the signing of several potentially noncontiguous and/or overlapping data objects. For each signed data object, a ds:Reference element, which points to the object via a Uniform Resource Identifier (URI), contains a digest value computed over that object. The digest value is computed using a given function such as MD5, SHA-1, a CRC, a combination thereof, or the like. The complete set of references is grouped together under a ds:SignedInfo element. The value of the ds:SignatureValue is then computed over the ds:SignedInfo element. In some cases, data objects referenced by URI may be relocated while still allowing the resolution to the data object. In cases where the location of the data object is important in the interpretation of the semantics associated with the data, this can lead to undesirable results, as will be seen below.

Figure 1:
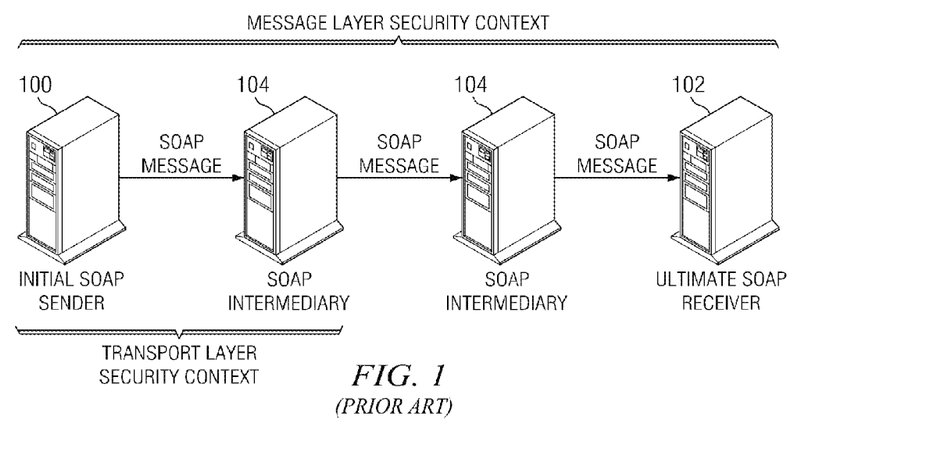
FIG. 1 depicts a Web Services environment wherein XML-based SOAP messages are communicated from a sender to a receiver and in which the present invention may be implemented.

By way of further background, SOAP defines XML syntax and processing rules facilitating the exchange of SOAP messages, such as shown in FIG. 1. A SOAP message typically comprises a soap:Envelope that contains a soap:Body element and an optional soap:Header element. The soap:Header element may contain a set of child elements that describe some message processing desired by the sender at the recipient. Each child of the soap:Header element may contain an actor or role attribute that indicates which receiving SOAP node is expected to perform the described processing. Each child of the soap:Header may contain a soap:mustUnderstand attribute that indicates whether a SOAP node should generate a fault if a message is received containing an element that is target at that node but for which no processing is defined. The implied default for soap:mustUnderstand is false, which allows nodes to discard elements that have no defined processing. This weakly specified, header mechanism can be used to exploit the location independence of XML Signature references by URI.

It is also known that WSS defines the syntax and processing rules associated with a wsse:Security element when the element is a child of the soap:Header. Receivers are expected to process elements in the order that they appear in the XML document. Elements in an wsse:Security element may include XML Signature (ds:Signature) elements, XML encryption elements, timestamps, and security tokens.

A typical WSS-compliant XML Signature protects an element's name, attributes, and value without protecting the element's position in the document. The following examples illustrate this vulnerability and, in particular, how an adversary can exploit the position independent semantics of XML Signatures. This discussion leads to the rationale behind the countermeasure that is the present invention.

The examples below are based on SOAP-specific constructs and message processing rules for illustrative purposes only.

Figure 2:
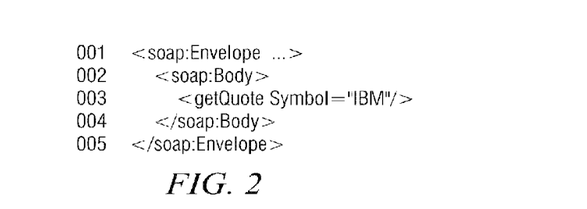
FIG. 2 is a representative SOAP message.

In some cases, an element is required in a document at a specific position and its semantics may be completely derived from its name, attributes, and value and the name of each of its ancestors. This is sometimes referred to as simple ancestry context. An example of such an element is the SOAP Body message 200, as shown in FIG. 2. As can be seen, the message is an XML document. In general, an XML document contains a single root element. Each element has a name, a set of attributes, and a value consisting of character data, and a set of child elements. The interpretation of the information conveyed in an element is derived by evaluating its name, attributes, value and position in the document. In this example, lines 001-005 contain a document root element named soap:Envelope. The syntax and semantics for the soap:Envelope are defined by SOAP. Lines 002-004 contain an element named soap:Body, which is a child of the soap:Envelope element. Line 003 contains a getQuote element that is a child of the soap:Body. The syntax and semantics for children of the soap:Body are application-specific. In this example, a stock quote application (e.g., executing on a receiver data processing system) receiving this message would be expected to return a message containing the price for the stock identified by the getQuote/@Symbol attribute value. The application might charge consumers for this service and, in such case, the application would need to authenticate the identity of the requester and protect relevant message content from intentional or unintentional modification during transmission. To that end, the service provider may publish a security policy having given requirements such as: (a) the soap:Body element be signed using WSS with XML Signature, and (b) the associated signature verification key be provided by a certificate (e.g., X.509v3) issued by one of a set of trusted Certificate Authorities (CAs).

Figure 3:
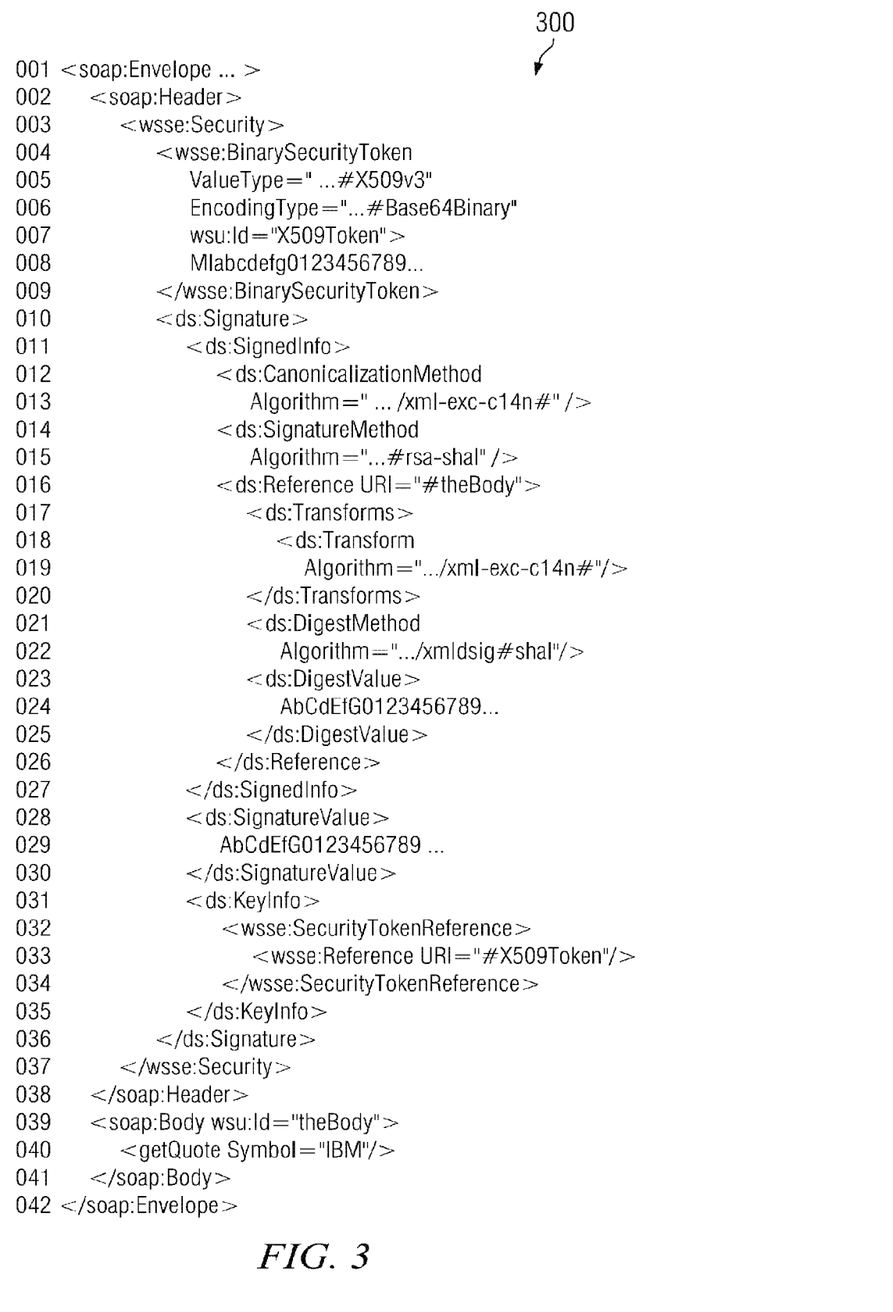
FIG. 3 is a representative SOAP message protected by a sender using XML Signature.

FIG. 3 illustrates a SOAP message 300 protected by the sender using WSS and XML Signature. Note that some details have been excluded or abbreviated, specifically namespace definitions, URIs, and digest and signature values. In this example, lines 039-041 contain the same soap:Body element from the example in FIG. 2, with the addition of the soap:Body/wsu:Id attribute. Lines 002-038 contain a soap: Header element that is a child of the soap:Envelope element. Lines 003-037 contain a wsse:Security element that is a child of the soap:Header element. The syntax and semantics for the wsse:Security element are defined by WSS. Lines 010-036 contain a ds:Signature that is a child of the wsse:Security element. The syntax and semantics for the ds:Signature element are defined by XML Signature. Lines 011-027 contain a ds:SignedInfo element that is a child of the ds:Signature element. The ds:Reference/@URI attribute contains a shorthand pointer as defined by the XPointer framework. The shorthand pointer identifies the soap:Body element by the value of its wsu:Id attribute. An XML parser running in the receiver data processing system would be used to perform efficient de-referencing of the shorthand pointers.

In particular, a receiver of the message in FIG. 3 processes the included signature to verify that the signed element, the soap:Body in this case, has not been altered after it was signed. The receiver also verifies that the requestor identified by the Subject of the certificate is authorized to make the request. Because the reference uses a position-independent shorthand pointer, however, the receiver of the message must enforce the expected security policy beyond merely verifying the signature and validating the certificate.

Figure 4:
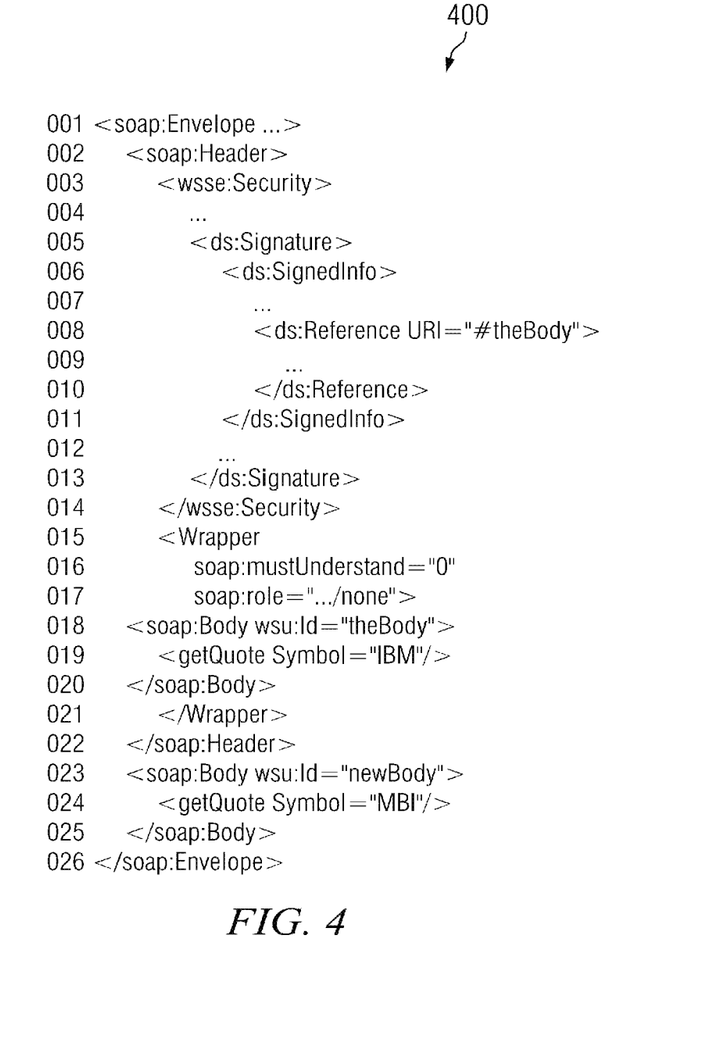
FIG. 4 is a modified version of the SOAP message shown in FIG. 3, as altered by an adversary attempting to gain unauthorized access to the message contents.

FIG. 4 illustrates a version 400 of the message 300 from FIG. 3, as altered by an adversary attempting to gain unauthorized access to the message contents. Some details from the previous message have been replaced by ellipses. In this example, lines 018-020 contain the soap:Body element from FIG. 3, unchanged except it is now a child of the Wrapper element contained on lines 015-021 instead of the soap:Envelope element. Lines 023-025 contain a new soap:Body element that is a child of the soap:Envelope element. The new soap:Body element specifies a different getQuote/@Symbol attribute value from that in the original soap:Body. In this example, the soap:mustUnderstand attribute is used to indicate to the SOAP processing layer that the Wrapper element can be safely ignored. Also, the soap:role attribute indicates to the SOAP processing layer that the Wrapper element is not targeted at the receiver. Even without these attributes, however, the expected behavior is the same because the receiver is not expected to understand how to process the invented Wrapper element, and a default behavior is to ignore header elements that are not understood. A naïve service implementation is likely to authorize this request because the message contains (a) a signature provided by an authorized requestor, (b) the value of the element referenced by the signature is unchanged, and (c) the reference uses a position independent mechanism. The attempted exploit, however, may be prevented by a properly specified and enforced security policy, such as the following (a) the element specified by /soap: Evelope/soap:Body must be signed using WSS with XML Signature, and (b) the associated signature verification key must be provided by an certificate issued by a trusted CA.

Thus, as noted by the previous example, proper security policy specification and enforcement can prevent attempts to move a signed element within a document when the element has a simple ancestry context. When an element is optional within the document, however, the specification of an enforceable security policy that prevents its relocation requires additional considerations, which are now described, once again first by way of example.

Figure 5:
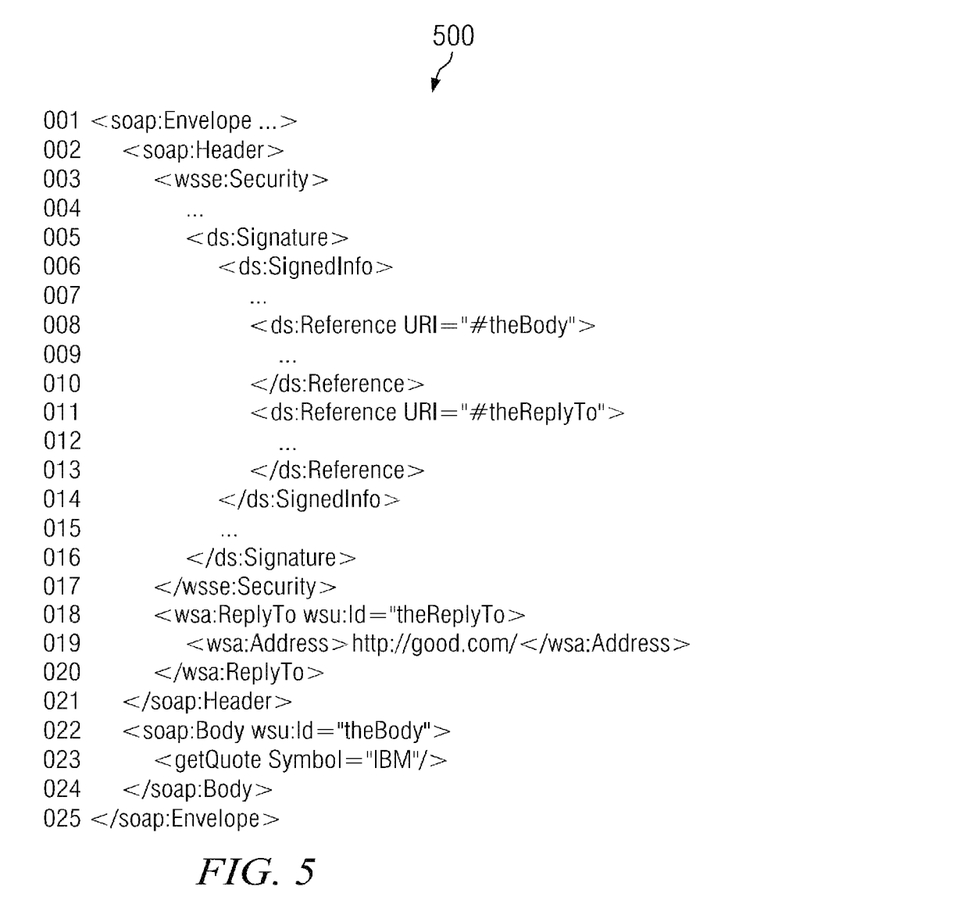
FIG. 5 is another representative SOAP message.

FIG. 5 contains a message 500 similar to the message 200 shown in FIG. 2, with the addition of an included and signed optional element. In this example, lines 018-020 contain a wsa:ReplyTo element that is a child of the soap:Header element. The wsa:ReplyTo element specifies where the response for this request should be sent. For the purposes of this example, assume that this element is optional. If this element is not present in the message, the response should be sent in the HTTP Response associated with the HTTP Request that contained the SOAP request message. Lines 011-013 contain an additional ds:Reference element that refers to the new wsa:ReplyTo element. The location where the response should be sent must be authenticated and protected from alteration. Assume the receiver side security policy is specified as follows: (a) the element specified by /soap:Envelope/ soap:Body must be referenced from a signature "A" using WSS with XML Signature, (b) if present, any element matching /soap:Envelope/soap:Header/wsa:ReplyTo must be referenced from a signature "A" using WSS with XML Signature, and (c) the signature "A" verification key must be provided by certificate issued a trusted CA. At first, this receiver side security policy specification appears adequate, however, this is not the case, as will be seen.

Figure 6:
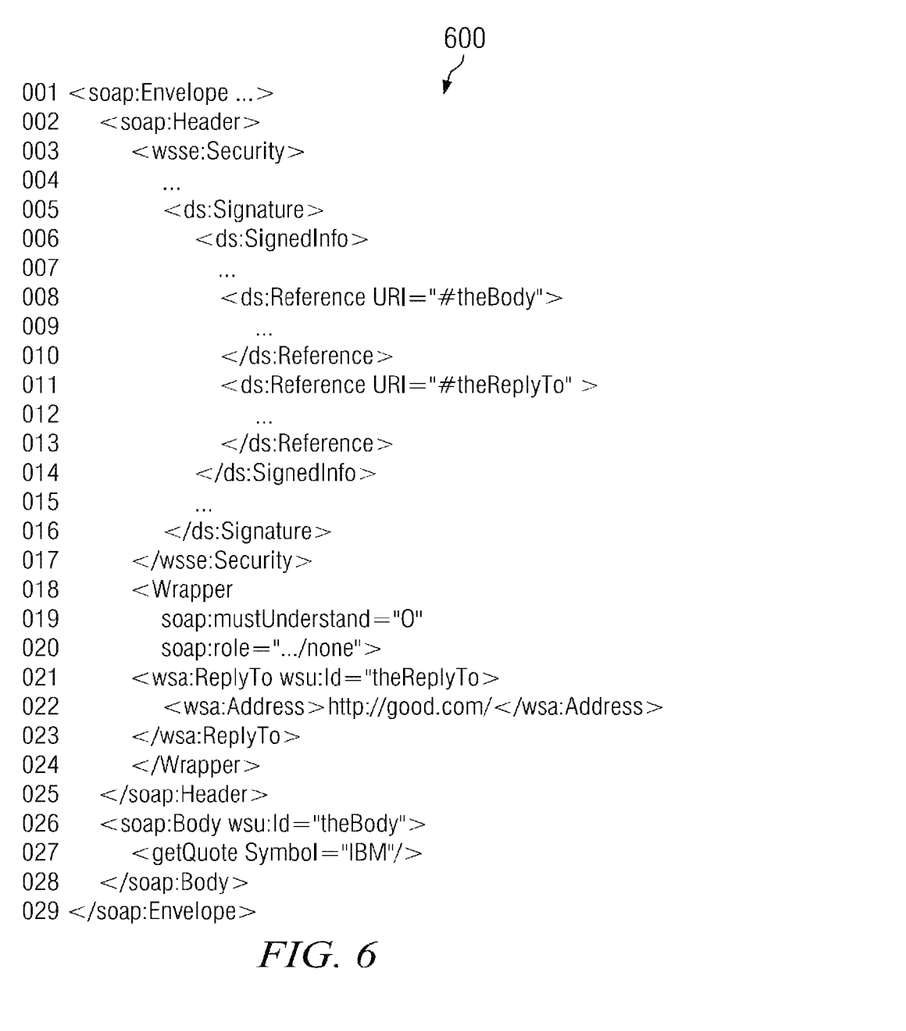
FIG. 6 is a modified version of the SOAP message shown in FIG. 5, as altered by an adversary attempting to gain unauthorized access to the message contents.

In particular, FIG. 6 illustrates an altered version 600 of the message 500 shown in FIG. 5. In this case, lines 018-023 contain a Wrapper element that contains the unchanged wsa: ReplyTo element. The SOAP processing layer dispatches only the soap:Body and entire children of the soap:Header for processing. Therefore, it will not dispatch the wrapped wsa: ReplyTo element, and the application will behave as if the message did not have a wsa:ReplyTo header element. But, because the receiver side security policy is met, the service may mistakenly authorize this request and return the response in the HTTP Response associated with the HTTP Request that contained the SOAP request. The above is an example where receiver side specification and enforcement of security policy does not provide the processing expected by the sender. Some additional specification by the sender thus is required.

Figure 7:
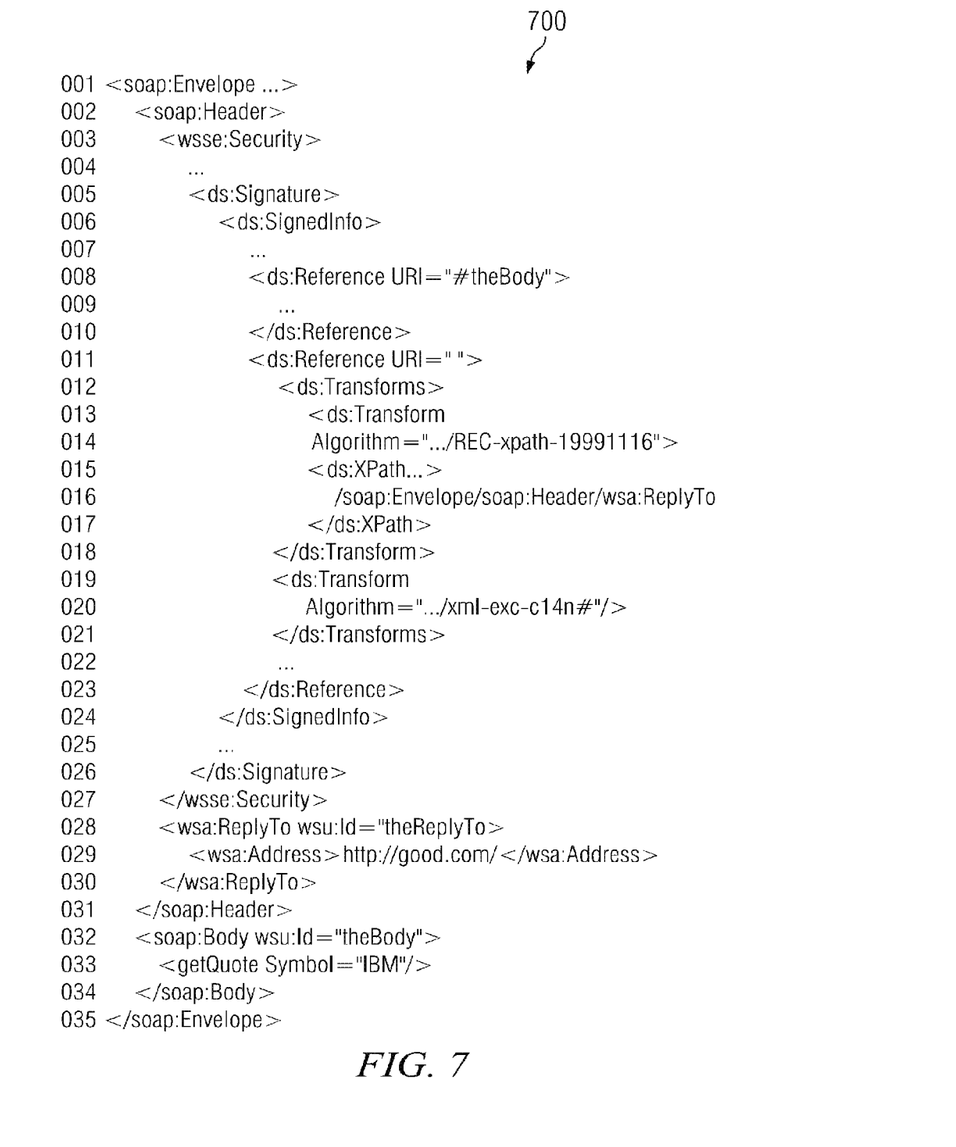
FIG. 7 illustrates a SOAP message like that in FIG. 5 that has been modified to include a transform that is adapted to be verified to provide a countermeasure against an adversary attack.

In particular, FIG. 7 illustrates a message based on the message 500 shown in FIG. 5. In this example, lines 011-023 contain an altered ds:Reference from the element shown in FIG. 5. The ds:Reference/@URI no longer specifies a shorthand pointer but is now empty. An empty URI identifies the document root. Lines 013-018 contain a new ds:Transform. The ds:Transform/@Algorithm specifies the XPath algorithm. Lines 015-017 contain a ds:XPath element that is a child of the ds:Transform element. Line 016 contains an XPath expression that specifies any element named wsa:ReplyTo that is a child of any element named soap:Header that is a child of any root element named soap:Envelope. This position dependent or absolute path XPath expression reference can be considered a sender side specification of security policy. If the wsa:ReplyTo element were moved from its intended position after the signature was generated, during signature verification the XPath expression would resolve to an empty nodeset and the digest value would not match. This operation suggests a refined receiver side security policy as follows: (a) the element specified by /soap:Evelope/soap:Body must be referenced from a signature "A" using WSS with XML Signature, (b) if present, any element matching /soap:Envelope/soap:Header/wsa:ReplyTo must be referenced via an absolute path XPath expression from a signature "A" using WSS with XML Signature, and (c) the signature "A" verification key must be provided by an (e.g., X.509v3) certificate issued by one of a set of trusted certificate authorities.

As the above discussion illustrates, XML Signatures can be used to effectively protect SOAP messages when appropriate security policies are specified and correctly enforced. As illustrated in particular in the discussion concerning FIG. 7, in one such solution the sender refers to the signed element via a position dependent or absolute path (e.g., XPath) expression. While this technique does provide a viable approach, it has a drawback. The XPath expression evaluation is very resource-intensive. Typically, it requires receiver-side evaluation of every element in the XML document. The present invention overcomes this deficiency through the use of an efficient receiver-side transform, which is now described.

Figure 8:
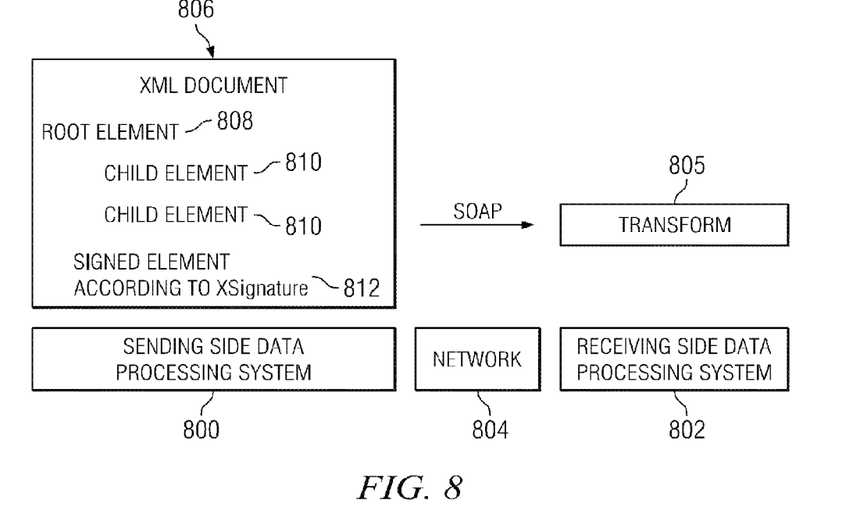
FIG. 8 is a simplified illustration of the receiver side data processing system of FIG. 1 having a transform that implements the countermeasure of the present invention.

The inventive transform assumes (as in the FIG. 7 example) a position dependent or absolute path XPath expression reference has been specified as a security policy on a sender side of the message communication. Then, on the receiver side, a novel, computationally-efficient transform algorithm is used to determine whether the element associated with the position dependent or absolute path expression has been moved during communication of the message from a sending side data processing system 800 to a receiving side data processing system 802. As described above, the message may pass through additional intermediary nodes in the network 804, which as noted may be, for example, the Internet, an intranet, or any other communications medium. The transform 805 typically is implemented as a computer program or code, namely, a set of program instructions, embodied on a computer useable medium. In general, transform 805 detects any movement of XML element 812 within the document structure after that element has been signed (for example, using XML Signatures) by the sending entity. As used herein, a movement of the signed element also may include a replacement of that element. As illustrated XML document 806 comprises a root element 808, a set of one or more child elements 810, and the signed element 812. As described above, XML Signature implements a two level signature, wherein the digest of the signed element is included in the Reference element, and wherein the Reference element also includes elements representing each Transform, and each of these elements may include XML content (e.g., like an XPath expression). This list of References (including digest, Transform list and their content) is applied to the digest function, with the result then being encrypted to form the signature. According to the invention, the transform 805 determines whether a position of the signed element within the received XML document has been altered. If the position of the signed element within the received XML document has not been altered, the transform preferably outputs the signed element 812. If, however, the position of the signed element within the received XML document has been altered, the transform preferably outputs a given value, such as a zero length octet string. Thus, if the signed XML element has not been moved during the transmission, the XML Signature over the signed XML element will verify; otherwise, it will not.

The transform works by enforcing an intended path from the signed element back up to the XML document root. In effect, the algorithm requires visitation of only the referenced element's ancestors, and not the entire XML tree. Thus, according to the transform, movement of the signed element is detected by locating the target element in the document (on the receiving side), and then evaluating the element's ancestors against the position dependent or absolute path expression that was included in the signed element (on the sending side). The algorithm is very computationally-efficient, as once a target element (in the received XML document) is located, the algorithm simply requires a test to determine whether a given element has the ancestor element as specified in the XPath expression. If the outcome is affirmative, the process continues, iteratively, to determine whether the ancestor element itself has the named ancestor element, and so on, back up the tree; the process continues until the root element is reached. If the root element is reached, the signed element is in the proper location; if (at any iteration) it is determined that the element being examined does not have an ancestor element, the algorithm returns an indication that the signed element is not where it is supposed to be located and then terminates. Thus, the transform takes an absolute location path expression (e.g., such as <XPath>/Soap:Envelope/Soap:Header/wsa:ReplyTo/) in the signed element and begins at a rightmost portion (in this case "wsa:ReplyTo"). More generally, the path expression may be considered a data string. The transform then determines whether the element in the path is named; if so, the transform determines whether the element's parent element (in this case, "Soap:Header") is named; if so, the transform continues to determine whether that element's parent (in this case, "Soap:Envelope") is named, and so on. When the root element is reached, the transform ends, as the location of the signed element has been verified (as unchanged).

Figure 9:
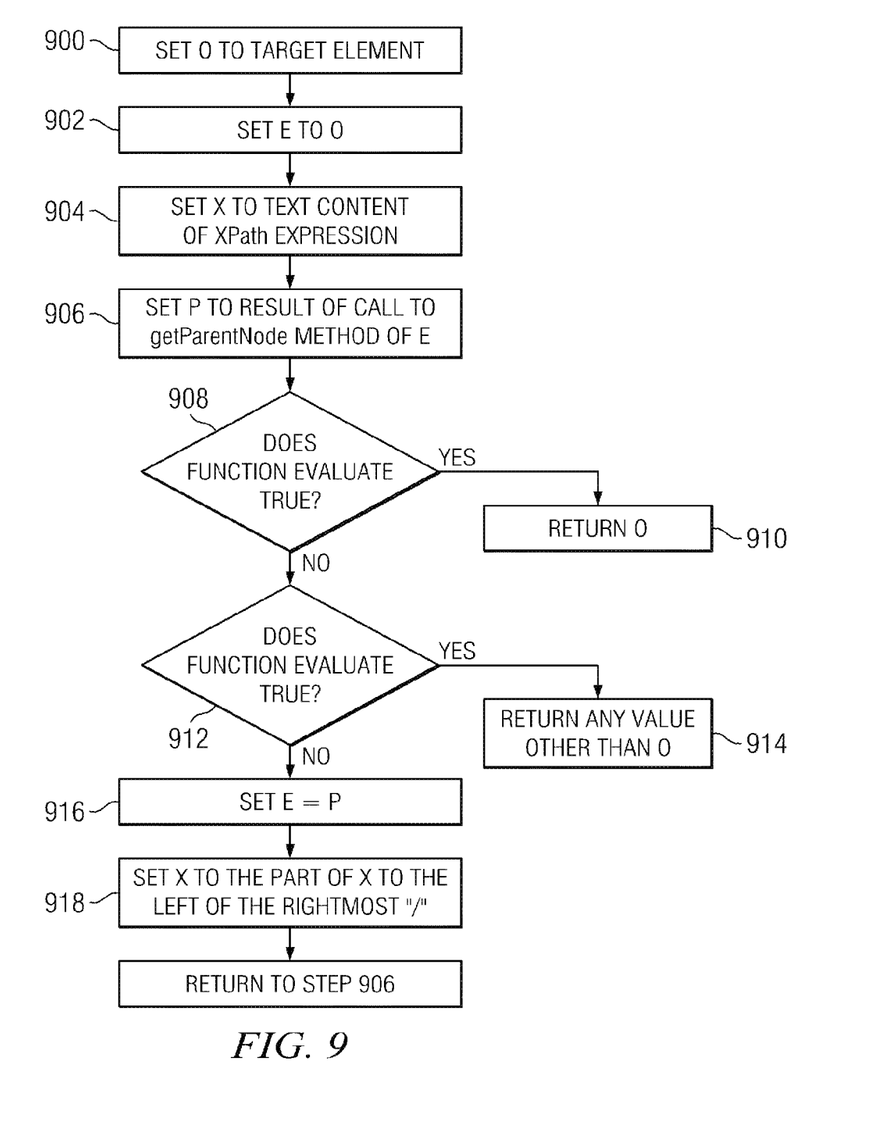
FIG. 9 is a process flow diagram illustrating a representative implementation of the transform algorithm.

FIG. 9 is a process flow diagram illustrating an embodiment of the transform algorithm. The routine begins at step 900 by setting a variable "O" (for "original") to a target signed element. In an illustrative embodiment, the target element is an element referenced by a URI via an XPointer IDREF (ID Reference) token. At step 902, the routine sets a variable "E" (for "element") to "O." At step 904, the routine sets a variable X (for "XPath") to the text content of the absolute path expression element. The routine then continues at step 906 to set a variable P (for a "parent" element) to the result of a call to a getParentNode method of E. A test is then performed at step 908 to determine whether the function "[(P=null) AND (Length (X)=0)]" evaluates as true; if so, root element has been reached and the routine branches to step 910 and returns O, the signed element. This indicates that the signed element has not been moved. If, however, the outcome of the test at step 910 has not evaluated as true, the routine continues at step 912 to determine whether the function "[(P=null) XOR (Length (X)=0)]" evaluates TRUE; if so, the signed element has been moved and the routine branches to step 914 and returns any value other than O. A representative value is zero. This indicates that the signed element has moved. If the function evaluated at step 912 is not TRUE, the routine continues at step 916 to set E=P. At step 918, the routines sets X to the part of X to the left of the rightmost forward slash ("/"). The routine then returns to step 906 and continues until either the function in step 908 or the function in step 912 is TRUE. This completes the processing.

The transform provides significant advantages over the prior art. As noted above, a main advantage is that the transform is quite efficient, computationally, as it does not require receiver-side evaluation of every element in the XML document. Rather, the input to the transform is an XML element (and its descendents). The parameters to the transform comprise an absolute path from the element to the XML document root element. Preferably, the output of the transform is in the input XML (and its descendents) if and only if the path from the input XML element to the XML document root element matches the path specified in the absolute path; otherwise, the output is preferably some other value, such as a zero length octet string. Preferably, as described and illustrated, the transform takes advantage of the relatively efficient and easy to use shorthand XPointer reference method (the IDREF) to locate the signed element initially, although any other convenient technique to locate the signed element in a received XML document can be used. Once the signed element is located, the transform readily determines whether the signed element (after signing) was moved from its original position in the XML document. The transform is simple to implement and obviates receiver-side evaluation of every element in the XML document. Rather, the transform only visits each parent element on its way back up the tree. Once the root element is reached, the transform has verified that the signed element is in its proper location vis-à-vis the other elements in the received XML document.

The present invention is not limited to use in evaluating signed element location or movement within an XML document; rather, the techniques described herein may be generalized for use with respect to any structured document (in any markup language) wherein given elements are supported in a hierarchical, tree-based manner. Moreover, the transform algorithm may be used whether the element itself has been processed according to XML Signature, or even whether the element itself has been signed.

Figure 10:
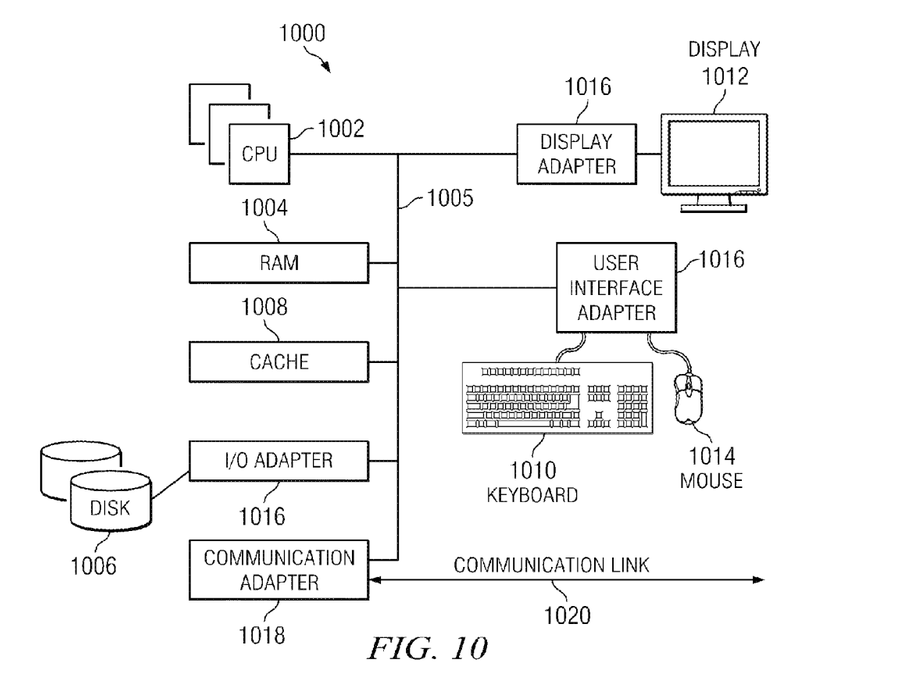
FIG. 10 is a block diagram of a representative data processing system in which the transform may be implemented.

FIG. 10 illustrates a representative data processing system 1000 for use as the sending or receiving entity. A data processing system 1000 suitable for storing and/or executing program code will include at least one processor 1002 coupled directly or indirectly to memory elements through a system bus 1005. The memory elements can include local memory 1004 employed during actual execution of the program code, bulk storage 1006, and cache memories 1008 that provide temporary storage of at least some program code to reduce the number of times code must be retrieved from bulk storage during execution. Input/output or I/O devices (including but not limited to keyboards 1010, displays 1012, pointing devices 1014, etc.) can be coupled to the system either directly or through intervening I/O controllers 1016. Network adapters 1018 may also be coupled to the system to enable the data processing system to become coupled to other data processing systems or devices through intervening private or public networks 1020.

The invention can take the form of an entirely hardware embodiment, an entirely software embodiment or an embodiment containing both hardware and software elements. In a preferred embodiment, the inventive transform is implemented in software, which includes but is not limited to firmware, resident software, microcode, and the like. Furthermore, as noted above, the invention can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The transform and related functions may also be implemented as a service.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Having described our invention, what we now claim is as follows:

1. A computer-implemented method, comprising:
   at a data processing entity, receiving a structured document comprising a set of elements including a root element and a set of one or more child elements, at least one child element being a signed element having a set of one or more ancestor elements and an associated path expression data string; and
   at the data processing entity, determining whether the signed element is in a given position within the received structured document by evaluating, iteratively, beginning with the signed element and moving upward in the structured document with respect to the set of one or more ancestor elements, whether a path from a given element is as specified in the path expression data string.

2. The computer-implemented method as described in claim 1 wherein the given position is a position at which the signed element was placed within the structured document prior to receipt of the structured document.

3. The computer-implemented method as described in claim 1 further including:
   outputting the signed element if the evaluating step determines that the signed element is in the given position; and
   outputting a given value other than the signed element if the evaluating step determines that the signed element is not in the given position.

4. The computer-implemented method as described in claim 1 wherein the evaluating step comprises:
   locating a current position of the signed element in the received structured document; and
   performing the following sub-steps, on an iterative basis, beginning from the current position of the signed element:
   (a) for each element, determining whether the element has an ancestor element in the path expression data string; and
   (b) if the element has an ancestor element in the path expression data string that is not the root element, repeating step (a) until the root element is reached or step (a) returns a negative outcome.

5. The computer-implemented method as described in claim 3 wherein the current position of the signed element is determined by evaluating a name of an attribute.

6. The computer-implemented method as described in claim 1 wherein the structured document is an XML document and the signed element is an XML Signature element.

7. The computer-implemented method as described in claim 6 wherein the path expression data string is an XPath expression.

8. The computer-implemented method as described in claim 1 wherein the path expression data string is a position dependent expression.

9. The computer-implemented method as described in claim 1 wherein the path expression data string is associated with a sending entity security policy.

10. A computer-implemented method, comprising:
   at a receiving data processing entity, receiving an XML document comprising a set of elements including a root element and a set of one or more child elements, at least one child element being a signed element having a set of one or more ancestor elements and an associated path expression data string; and
   at the receiving data processing entity, locating a current position of the signed element in the received XML document;
   at the receiving data processing entity, starting from the current position of the signed element, determining whether the signed element is in a position at which the signed element was placed originally within the XML document by evaluating, iteratively, beginning with the signed element and moving upward in the XML document with respect to the set of one or more ancestor elements, whether a path from a given element is as specified in the path expression data string.

11. The computer-implemented method as described in claim 10 further including:
   outputting the signed element if the evaluating step determines that the signed element is in the position; and
   outputting a given value other than the signed element if the evaluating step determines that the signed element is not in the position.

12. The computer-implemented method as described in claim 10 wherein the evaluating step comprises:
   performing the following sub-steps, on an iterative basis, beginning from the current position of the signed element:
      (a) for each element, determining whether the element has an ancestor element in the path expression data string; and
      (b) if the element has an ancestor element in the path expression data string that is not the root element, repeating step (a) until the root element is reached or step (a) returns a negative outcome.

13. The computer-implemented method as described in claim 10 wherein the signed element is an XML Signature element and the path expression data string is an XPath expression.

14. The computer-implemented method as described in claim 13 wherein the current position of the signed element is specified in an XPointer token.

15. A computer program product comprising a computer storage medium having a computer readable program, wherein the computer readable program when executed on a computer causes the computer to perform method steps on a structured document, the structured document comprising a root element and at least one child element that has been secured according to a protection mechanism, the child element having a set of one or more ancestor elements and an associated path expression data string, the method steps comprising:
   locating a current position of the signed element in the structured document; and
   starting from the current position of the signed element, determining whether the signed element is in a given position within the structured document by evaluating, iteratively, beginning with the signed element and moving upward in the structured document with respect to the set of one or more ancestor elements, whether a path from a given element is as specified in the path expression data string.

16. The computer program product as described in claim 15 wherein the method steps further include:
   outputting the signed element if the evaluating step determines that the signed element is in the given position; and
   outputting a given value other than the signed element if the evaluating step determines that the signed element is not in the given position.

17. The computer program product as described in claim 15 wherein the evaluating step includes:
   performing the following sub-steps, on an iterative basis, beginning from the current position of the signed element:
      (a) for each element, determining whether the element has an ancestor element in the path expression data string; and
      (b) if the element has an ancestor element in the path expression data string that is not the root element, repeating step (a) until the root element is reached or step (a) returns a negative outcome.

18. The computer program product as described in claim 15 wherein the protection mechanism is a digital signature.

19. The computer program product as described in claim 18 wherein the structured document is an XML document and the digital signature is an XML Signature.

20. The computer program product as described in claim 19 wherein the path expression data string is an XPath expression.

21. In a system wherein a sending entity transmits a structured document over a network, the structured document having a root element and at least one child element that has been signed by the sending entity prior to transmission, and wherein the sending entity includes within the signed child element a reference that identifies a position-dependent or absolute path from the root element to the child element, a receiving entity, the receiving entity comprising:
   a processor; and
   code executed by the processor to determine whether the signed child element has been moved during transmission of the structured document from the sending entity to the receiving entity, wherein the determination is made by evaluating, iteratively, beginning with the signed child element and moving upward in the structured document with respect to one or more ancestor elements, whether a path from a given element is as specified in the reference.

22. A system, comprising:
   a sending entity comprising a processor, and code executed by the processor to generate a structured document, the structured document having a root element and at least one child element that has been signed prior to transmission, the signed child element including a reference that identifies a position-dependent or absolute path in the structured document from the root element to the child element; and a receiving entity comprising a processor, and code executed by the processor in the receiving entity in response to receipt of the structured document to determine whether the signed child element has been moved during transmission, wherein the determination is made by evaluating, iteratively, beginning with the signed child element and moving upward in the structured document with respect to one or more ancestor elements, whether a path from a given element is as specified in the reference.

\* \* \* \* \*